June 24, 1924.

H. L. REED

SAFETY HITCH FOR TRACTORS

Filed Aug. 23, 1922

Inventor
H. L. Reed,

By Etienne Talbert
Attorney

June 24, 1924.

H. L. REED

SAFETY HITCH FOR TRACTORS

Filed Aug. 23, 1922

Inventor
H. L. Reed,
By E. Hume Talbert
Attorney

Patented June 24, 1924.

1,498,752

UNITED STATES PATENT OFFICE.

HAROLD L. REED, OF NEW HAVEN, CONNECTICUT, ASSIGNOR OF ONE-HALF TO H. S. ALLIS, OF NEW HAVEN, CONNECTICUT.

SAFETY HITCH FOR TRACTORS.

Application filed August 23, 1922. Serial No. 583,747.

*To all whom it may concern:*

Be it known that HAROLD L. REED, a citizen of the United States of America, residing at New Haven, in the county of New Haven and State of Connecticut, has invented new and useful Improvements in Safety Hitches for Tractors, of which the following is a specification.

The object of the invention is to provide a tractor hitch through the agency of which trailers such as agricultural machinery, draft chains, and the like may be connected with a tractor under such conditions as to prevent the objectionable and certainly disastrous rearing of the tractor when the trailer encounters an obstacle or resistance in the course of its operation and likewise to prevent the seating of the driver of the tractor in a soft or yielding surface to the extent involving the miring and stalling of the machine; and with this object in view the invention consists in a construction and combination of parts of which a preferred embodiment is shown in the accompanying drawings, wherein:—

Figure 1:
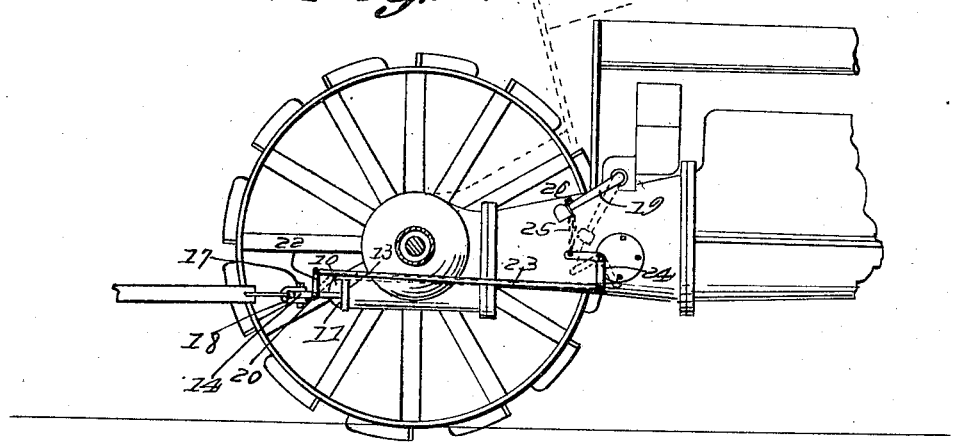
Figure 1 is a side view of a hitch embodying the invention applied in the operative position to a tractor with which is connected a trailer indicated in outline, the tractor being shown in full lines in the normal and in the dotted lines in the rearing position.
Figure 2:
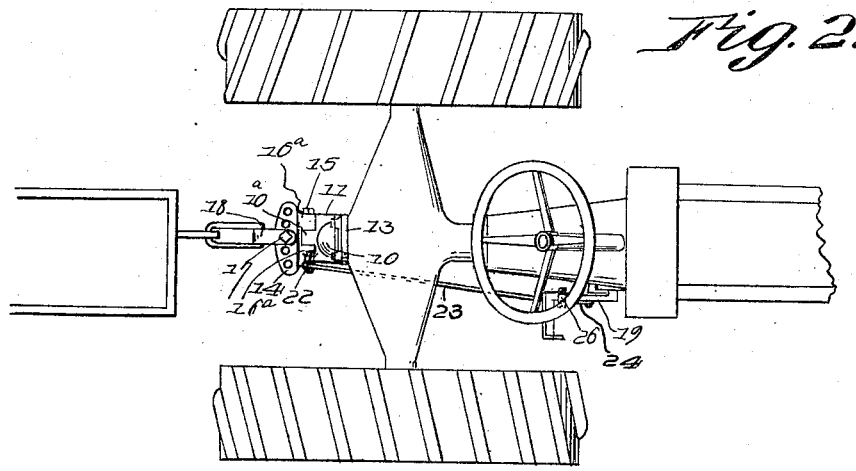
Figure 2 is a plan view of the apparatus.
Figure 3:
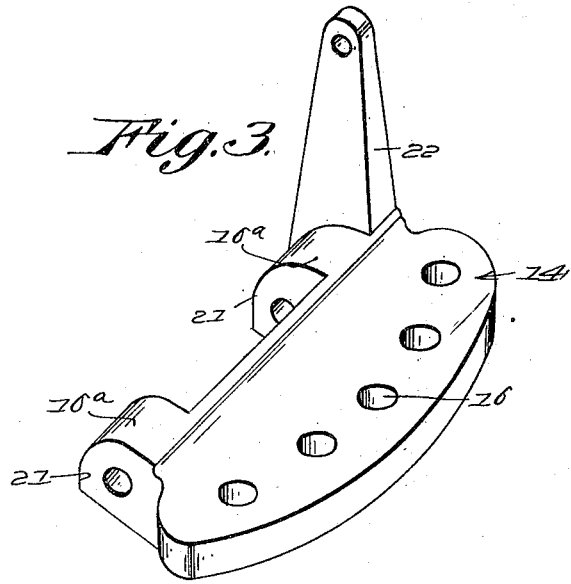
Figure 3 is a detail view of the tilting hitch bar.
Figure 4:
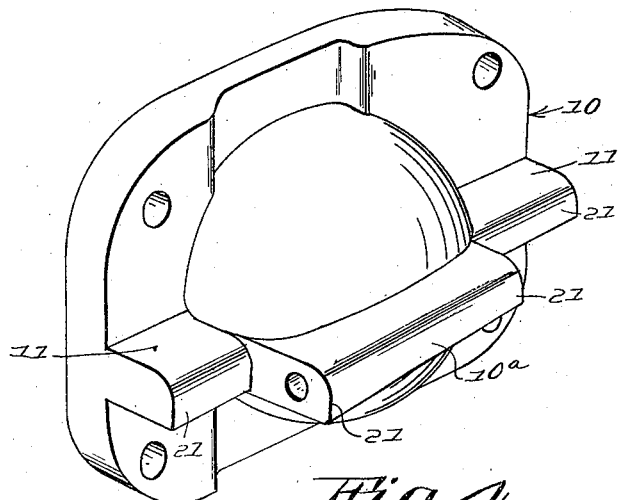
Figure 4 is a similar view of the attaching member or bracket upon which the hitch bar is mounted.

The apparatus consists essentially of an attaching member or bracket 10 having a securing plate 11 adapted to be secured by bolts 12 or the equivalents thereof to the tractor frame indicated at 13, a hitch bar 14 pivotally mounted by means of a horizontal fulcrum pin 15 to the attaching member and perforated as indicated at 16 for engagement by the bolt 17 of a draft clevis 18 with which the trailer is connected as in the ordinary practice, and connections between said hitch bar and the clutch pedal 19 of the tractor whereby when the hitch bar swings relative to the tractor frame in the one direction in which it is permitted to move it serves to actuate the clutch pedal and move it to the clutch released position.

The hitch bar is provided with ears 16[a] between which is arranged an ear 10[a] of the attaching member, and these ears are perforated in registration for the reception of the hinge pin 15 which is terminally secured by cotter pins 20 or the equivalents thereof, and the abutting surfaces of the hitch bar and attaching member are provided with square shoulders indicated at 21 for abutting relation to limit the downward movement of the hitch bar with relation to the attaching plate to a position in alignment horizontally therewith while permitting an upward swinging movement of either with relation to the other, so that with the tractor in its normal position a fixed relation of the hitch bar with reference thereto is maintained, but when an extraordinary resistance is applied to the trailer as by the engagement thereof with an immovable object such as a rock or root, there is the usual tendency for the tractor to rear upward at its forward end and which in the ordinary practice results in an overturning backwardly of the tractor to the discomfort and frequently to the serious injury to the operator who may be unable to extricate himself and jump from the tractor in time to escape.

In the construction illustrated the hitch bar is provided with an upwardly directed arm 22 connected by a push rod 23 with one arm of a bell-crank lever 24 suitably mounted for pivotal movement on the frame of the tractor and having its other arm connected for example by a chain 25 with the clutch pedal, a clip 26 being employed to effect the required engagement with said pedal.

With this construction, when the tractor commences to tilt or rear under the resistance offered by the trailer as above noted the normal relation between the hitch bar and the attaching member 10 is altered by a tilting movement of the latter with relation to the former, the hitch bar being retained in its horizontal position by the strain of the trailer on the clevis 18, and this tilting movement operating through the arm 22 and the push bar 23 serves to swing the bell-crank lever with relation to the frame of the tractor in the direction indicated by the arrow in Figure 1 to thus tension the chain 25 and move the clutch pedal to its disengaged position. Obviously the release of the clutch permits the tractor, before it has reached the balance point, to drop to its normal position. The chain obviously may be taken up more or less to secure the proper adjustment thereof with relation to the clutch pedal and the other parts of the mechanism to suit the peculiarities of the tractor to which the device may be applied so that an upward tilting of the front of the tractor amounting to only a few inches will be sufficient to disengage the clutch. The same operation occurs in the event that the tractor wheel should sink in a soft surface so that the disengagement of the clutch will take place before the tractor wheels have become mired to a sufficient depth to stall the engine or prevent extrication.

Having described the invention, what is claimed as new and useful is:—

1. A safety hitch for tractors having a hitch bar pivotally mounted for upward swinging movement with relation to the frame of the tractor, and connections between said hitch bar and the clutch pedal of the tractor whereby a tilting movement of the former effects a clutch releasing movement of the latter, said connections consisting of an upwardly directed arm on the hitch bar, a bell-crank lever having one arm connected by a push bar with the hitch bar arm, and a flexible connection between the other arm of the bell-crank lever and said clutch pedal.

2. A safety hitch for tractors having a hitch bar pivotally mounted for upward swinging movement in relation to the frame of the tractor, and connections between said hitch bar and the clutch pedal of the tractor whereby a tilting movement of the former effects a clutch releasing movement of the latter, said connections consisting of an upwardly directed arm on the hitch bar, a bell-crank lever having one arm connected by a push bar with the hitch bar arm, and a flexible connection between the other arm of the bell-crank lever and said clutch pedal, means being provided for effecting an adjustment of said flexible connection with the clutch pedal.

3. A safety hitch for tractors consisting of an attaching member having means for engagement with the draft bar of the tractor frame, a hitch bar pivotally mounted upon the attaching member and having means for the connection of a draft clevis therewith, said hitch bar being provided with an upwardly directed arm, and connections between said hitch bar arm and the tractor clutch pedal, the hitch bar and attaching member being provided with abutting shoulders for limiting the relative downward swinging movement of the former.

4. A safety hitch for tractors consisting of an attaching member having means for engagement with the draft bar of the tractor frame, a hitch bar pivotally mounted upon the attaching member and having means for the connection of a draft clevis therewith, said hitch bar being provided with an upwardly directed arm, and connections between said hitch bar arm and the tractor clutch pedal, the hitch bar and attaching member being provided with interlocking transversely perforated ears, and a hitch pin being extended therethrough to form the pivotal connection between said members.

In testimony whereof he affixes his signature.

HAROLD L. REED.